United States Patent [19]

Craft et al.

[11] Patent Number: 5,647,246

[45] Date of Patent: Jul. 15, 1997

[54] REVERSE IDLER SHAFT AND WASHER ASSEMBLY

[75] Inventors: Robert B. Craft, Ceresco; William R. Chene, Kalamazoo; Robert J. Bailey, Portage, all of Mich.; Ivars Liliensteins, Shelby, N.C.

[73] Assignee: Eaton Corporation, Cleveland, Ohio

[21] Appl. No.: 443,349

[22] Filed: May 17, 1995

Related U.S. Application Data

[63] Continuation-in-part of Ser. No. 157,488, Nov. 23, 1993, Pat. No. 5,505,102.

[51] Int. Cl.$^6$ ............................. F16H 57/04; F16H 3/08
[52] U.S. Cl. ................. 74/467; 74/331; 74/360; 74/414
[58] Field of Search ..................... 74/467, 325, 331, 74/360, 413, 414, 421 R; 384/474, 462

[56] References Cited

U.S. PATENT DOCUMENTS

| | | |
|---|---|---|
| 4,428,247 | 1/1984 | Young ........................... 74/331 |
| 4,615,231 | 10/1986 | Kaisha ........................... 74/467 |
| 4,650,430 | 3/1987 | Schiek ........................... 440/88 |
| 4,735,109 | 4/1988 | Richards et al. ............... 74/331 |
| 4,757,887 | 7/1988 | Ostrander et al. ............. 192/41 A |
| 4,776,237 | 10/1988 | Premiski et al. ............... 74/750 R |
| 4,793,200 | 12/1988 | McDonald ..................... 74/331 |
| 5,175,999 | 1/1993 | Hara et al. ..................... 60/339 |
| 5,320,433 | 6/1994 | Kimata et al. ................. 384/473 |
| 5,370,013 | 12/1994 | Reynolds et al. .............. 74/331 |
| 5,505,102 | 4/1996 | Craft ............................. 74/467 |

*Primary Examiner*—Charles A. Marmor
*Assistant Examiner*—Sherry Lynn Estremsky
*Attorney, Agent, or Firm*—Brooks & Kushman PC

[57] ABSTRACT

A reverse idler shaft and washer assembly particularly suited for use in a compound transmission includes a lubricating washer having at least one notch for collecting and directing lubricating oil through a reverse idler gear bearing such that lubrication passageways are eliminated from the reverse idler shaft. The lubricating washer includes an annular region capable of supporting a clamping load through the inner race of the reverse idler gear bearing to resist rotation while allowing the outer race and the associated reverse idler gear to rotate freely.

11 Claims, 5 Drawing Sheets

5,647,246

REVERSE IDLER SHAFT AND WASHER ASSEMBLY

This is a continuation-in-part of application Ser. No. 157,488, filed Nov. 23, 1993, now U.S. Pat. No. 5,505,102.

TECHNICAL FIELD

The present invention relates to a washer or spacer and reverse idler shaft assembly particularly suited for use in a compound change gear transmission.

BACKGROUND ART

Compound change gear transmissions of the type having one or more auxiliary sections connected in series with a main transmission section are well known in the prior art. Briefly, by utilizing main and auxiliary transmission sections connected in series, assuming proper sizing of the ratio steps, the total of available transmission ratios is equal to the product of the main section ratios and the auxiliary section ratios. By way of example, at least in theory, a compound change gear transmission including a four (4) speed main section connected in series with a three (3) speed auxiliary section will provide twelve available gear ratios (4×3=12).

Auxiliary transmission sections are of three general types: range type, splitter type or combined range and splitter type.

In compound transmissions having a range type auxiliary section, the ratio step or steps may be greater than, equal to, or less than the total ratio coverage of the main transmission section. The main section is then shifted progressively through its ratios in each range. Examples of compound transmissions having range type auxiliary sections may be seen by reference to U.S. Pat. Nos. 3,105,395; 2,637,222 and 2,637,221, the disclosures of which are hereby incorporated by reference in their entirety.

In compound transmissions having a splitter type auxiliary section, the ratio steps of the splitter auxiliary section are less than the ratio steps of the main transmission section. In these transmissions each main section ratio is split, or subdivided, by the splitter section. Examples of compound change gear transmissions having splitter type auxiliary sections may be seen by reference to U.S. Pat. Nos. 4,290,515; 3,799,002; 4,440,037 and 4,527,447, the disclosures of which are hereby incorporated by reference in their entirety.

In a combined range and splitter type auxiliary section, or sections, both range and splitter type ratios are provided. This allows the main section to be progressively shifted through available ratios divided into at least two ranges while also allowing the main section ratios to be split in at least one of the ranges.

Examples of a compound transmission having a single combined range/splitter type auxiliary section may be seen by reference to U.S. Pat. Nos. 3,283,613; 3,648,546, the disclosures of which are hereby incorporated by reference in their entirety. A single combined range/splitter type auxiliary section may also be seen by reference to publication Small Scale Print No. 016-AD; Fuller Transmissions; Models RT-14613, RTO-14613, RTOO-14613, published March 1981 by Eaton Corporation, assignee of the present invention, the disclosure of which is hereby incorporated by reference in its entirety. Another example is the "Ecosplit" model of transmission sold by Zahnradfabrik Friedrichshafen Aktiengeseushaft of Friedrichshafen, Federal Republic of Germany, which utilizes a separate splitter auxiliary section located in front of the main transmission section and a separate range auxiliary section located behind the main transmission section.

It should be noted that the terms main and auxiliary sections are relative. Thus, if the designations for the main and auxiliary sections are reversed, the type of auxiliary section (either range or splitter) will also be reversed. In other words, given what is conventionally considered a four-speed main section with a two-speed range type auxiliary section, if the normally designated auxiliary section is considered the main section, the normally designated main section would be considered a four-speed splitter type auxiliary section. By generally accepted transmission industry convention, and as used in describing the present invention, the main transmission section of a compound transmission is that section which contains the greater number (or equal number) of forward speed ratios, which allows selection of a neutral position, which contains the reverse ratio(s) and/or which is shifted (in manual or semiautomatic transmissions) by manipulation of a shift bar, shift rail, shift shaft, or shift finger assembly. Typically the auxiliary section is shifted via a master/slave valve/cylinder arrangement, or the like.

In a conventional main transmission section, torque is transferred from an input shaft through an input gear pair, which is in constant meshing engagement, to at least one main section countershaft. As its name suggests (and the meshing gear connection requires), the countershaft rotates in a direction opposite from that of the input shaft. For forward gear ratios, torque is transferred from the countershaft through a second gear pair which is in constant meshing engagement to a mainshaft which would then rotate in the same direction as the input shaft. This method of torque transfer is repeated through the auxiliary section so the output shaft rotates in the same direction as the input shaft. To achieve reverse gear ratios, an idler gear is interposed between a gear mounted on one or more of the countershafts, and a corresponding (reverse) gear which is selectively engageable to the mainshaft. Thus, when the reverse gear is engaged, the countershaft spins in the same direction as the mainshaft (and the output shaft) which is opposite to that of the input shaft so as to provide a reverse gear ratio.

A conventional auxiliary transmission section, such as that disclosed in U.S. Pat. No. 4,754,665, includes a mainshaft assembly having an auxiliary section input gear selectively engageable thereto via a conventional jaw clutch. The auxiliary transmission section includes a number of gear layers, combined range and splitter gearing, and distinct selectable auxiliary section ratios. Typically, torque is transferred through the auxiliary section input gear to an auxiliary section countershaft gear which is in constant mesh and mounted on the auxiliary section countershaft. As with the main section drive gears and countershaft gears, selective engagement of various gear combinations provides a number of selectable torque flow paths to provide the various ratios between the input and output shafts.

Conventional transmissions utilize a number of bearings to support the various shafts within a transmission case or housing while allowing relatively low friction rotation. To further reduce rotational and sliding friction, and the associated heat generated by rotating transmission components, a petroleum or synthetic based lubricant is contained within the transmission housing. A variety of techniques may be used to continuously provide lubricant to various contacting surfaces and bearings. Strategically placed reservoirs and appropriately sized channels, passageways, and orifices can utilize the centrifugal force of the rotating components in combination with gravitational forces, to direct the lubricant to appropriate locations within the transmission. Of course, it is desirable to minimize the number of manufacturing and/or assembly operations necessary in providing sufficient lubrication to necessary locations.

DISCLOSURE OF THE INVENTION

An object of the present invention is to provide a compound change gear transmission having a reverse idler assembly which requires fewer manufacturing/machining operations than conventional designs.

Another object of the present invention is to provide a washer or spacer particularly suited for use in a reverse idler assembly of a compound change gear transmission which provides sufficient lubrication to one or more reverse idler bearings while supporting a clamping load.

A further object of the present invention is to provide a reverse idler assembly for a compound change gear transmission including a solid core reverse idler shaft which requires fewer machining operations than prior art assemblies.

Yet another object of the present invention is to provide a reverse idler assembly for a compound change gear transmission which utilizes gravity/splash lubrication to lubricate reverse idler bearings.

In carrying out the above objects and other objects and features of the present invention, a compound change gear transmission includes a main section connected in series with an auxiliary section, the main section including a housing for containing a main shaft generally coaxial with the input shaft and at least one countershaft generally parallel to the main shaft and the input shaft, the main shaft having a plurality of gears including a reverse gear mounted for selective engagement thereto, and each of the at least one countershaft having a corresponding plurality of gears mounted for rotation therewith including a reverse countershaft gear. The transmission also includes a reverse idler shaft mounted to a portion of the main section housing, a bearing having an inner race and a plurality of elements facilitating rotation of a component in contact therewith, the inner race being mounted on the reverse idler shaft, a reverse idler gear mounted on the plurality of elements, the reverse idler gear being in constant meshing engagement with the reverse gear and the at least one reverse countershaft, and a washer interposed between the bearing and the portion of the housing, the washer having at least one notch for directing lubricating oil to the plurality of elements facilitating rotation.

The advantages accruing to the present invention are numerous. For example, a significant cost reduction is achieved by eliminating a number of machining operations which were required to provide an adequate lubrication flow to the reverse idler bearings. Furthermore, the present invention eliminates the necessity of a reverse idler shaft plug and the associated assembly operation while providing a substantially solid-core reverse idler shaft construction.

The above objects and other objects, features, and advantages of the present invention will be readily appreciated by one of ordinary skill in this art from the following detailed description of the best mode for carrying out the invention when taken in connection with the accompanying drawings.

BEST MODE FOR CARRYING OUT THE INVENTION

Figure 1:
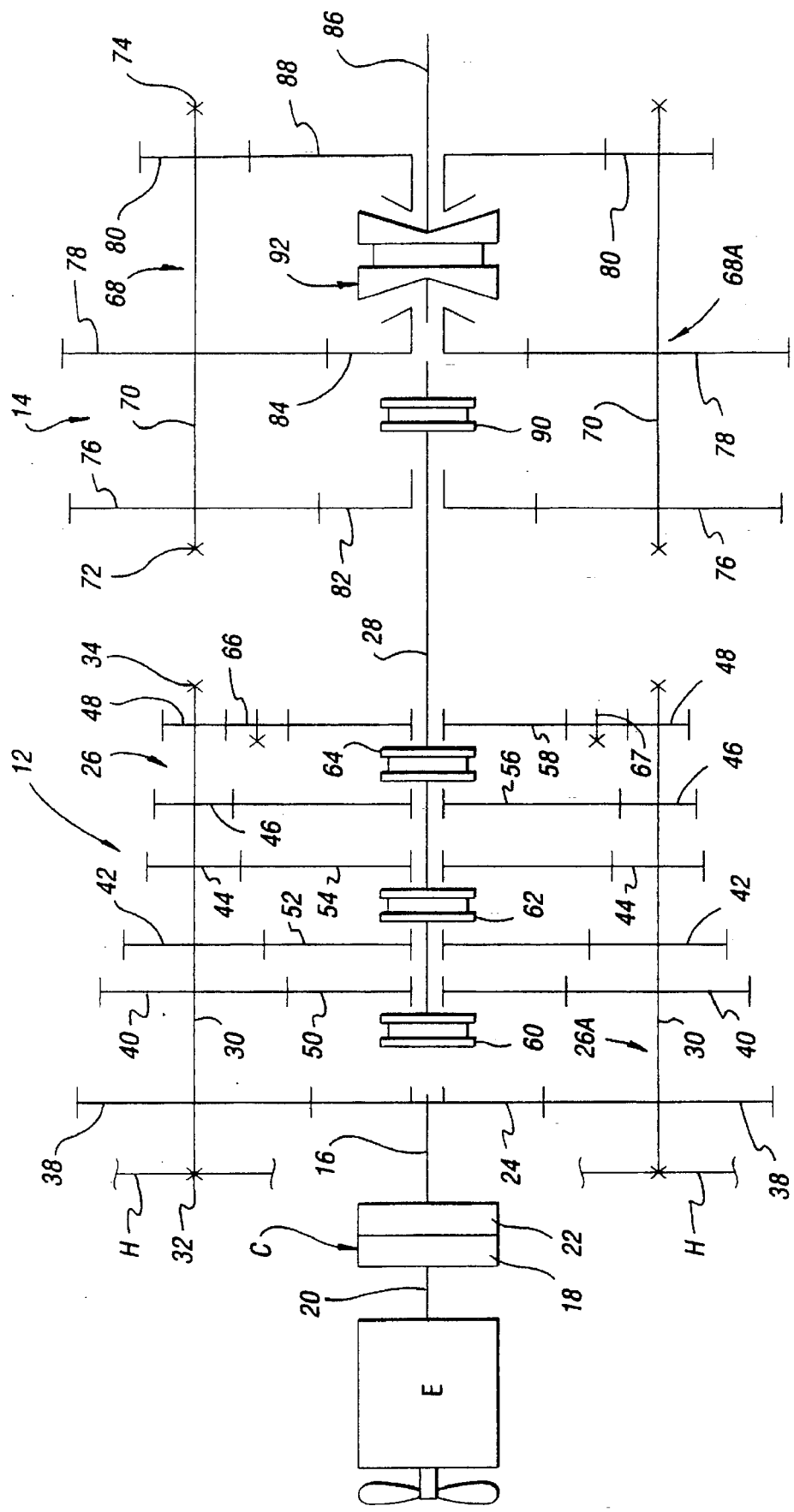
FIG. 1 is a schematic illustration of a prior art compound transmission having a multi-speed main transmission section utilizing conventional reverse idler assemblies.

The following terminology as used in the description of the present invention is for convenience only and thus, will not be limiting. Orientational words and phrases such as "upwardly", "downwardly", "rightwardly", and "leftwardly" will designate directions in the drawings to which reference is made. The words "forward" and "rearward" will refer respectively to the front and rear ends of a transmission as conventionally mounted in a vehicle, corresponding respectively to the left and right sides of the prior art main transmission section illustrated in FIG. 1.

The term "compound transmission" is used to designate a change speed or change gear transmission having a main transmission section and an auxiliary transmission section connected in series whereby the selected gear reduction (or multiplication) in the main transmission section may be compounded by a further selected gear reduction (or multiplication) in the auxiliary transmission section. The term "upshift" as used herein shall mean the speed gear ratio is changed from a lower value to a higher value. The term "downshift" as used herein shall mean the shifting from a higher speed gear ratio to a lower speed gear ratio. The terms "low speed gear" or "low gear" as used herein shall designate a gear ratio utilized for relatively lower forward speed operation in a transmission, i.e. a set of gears having a higher ratio of reduction of output shaft speed relative to the speed of the input shaft. "Synchronizing clutch assembly" and words of similar import shall designate a clutch assembly utilized to non-rotatably couple a selected gear to a shaft by means of a positive clutch. Attempted engagement of the positive clutch is prevented until the members of the clutch are at substantially similar rotation speeds. The synchronized clutch assembly includes relatively large capacity friction means associated with the clutch members which are sufficient, upon initiation of a clutch engagement, to cause the clutch members and all members rotating therewith to rotate at a substantially synchronous speed.

FIG. 1 schematically illustrates a well known, commercially successful compound transmission, indicated generally by reference numeral 10, having eighteen forward speeds. Transmission 10 includes a main transmission section, indicated generally by reference numeral 12, connected in series with an auxiliary transmission section, indicated generally by reference numeral 14. Typically, transmission 10 is housed in a single housing and includes an input shaft 16 driven by an engine E through a selectively disengaged, normally engaged, master friction clutch C. Master friction clutch C includes an input or driving section 18 connected to the engine crankshaft 20, and a driven portion 22 rotatably fixed to a transmission input shaft 16.

With continuing reference to FIG. 1, within main transmission section 12, input shaft 16 carries an input gear 24 for simultaneously driving at least one main section countershaft assembly. In the transmission illustrated, two (2) substantially similar main section countershaft assemblies 26 and 26A are provided on diametrically opposite sides of a mainshaft 28 which is generally coaxially aligned with input shaft 16. Each of the main section countershaft assemblies 26 and 26A includes a main section countershaft 30 supported by bearings 32 and 34 in housing H, only a portion of which is schematically illustrated.

Each of the main section countershafts 30 is provided with a substantially similar grouping of main section countershaft gears 38, 40, 42, 44, 46 and 48, fixed for rotation therewith. A plurality of main section drive gears (mainshaft gears) 50, 52, 54, 56 and 58 surround mainshaft 28 and are selectively clutchable to mainshaft 28 for rotation therewith via sliding jaw clutch collars 60, 62 and 64 as is well known in the art. Clutch collar 60 may also be utilized to clutch input gear 24 to mainshaft 28 to provide a direct drive relationship between input shaft 16 and mainshaft 28. Preferably, each of the main section mainshaft gears encircles mainshaft 28 and is in continuous meshing engagement with, and floatingly supported by an associated countershaft gear group.

Typically, sliding jaw clutch collars 60, 62 and 64 are axially positioned by means of shift forks (not illustrated) associated with a shift bar housing assembly (not illustrated) as is well known in the art. Sliding jaw clutch collars 60, 62 and 64 are of the well known non-synchronized double acting jaw clutch type. Sliding jaw clutches collars 60, 62 and 64 define three-position clutches which may be positioned in a centered, non-engaged position as illustrated, in a fully rightwardly engaged position, or in a fully leftwardly engaged position.

With continuing reference to FIG. 1, main section mainshaft gear 58 functions as a reverse gear which is in continuous meshing engagement with countershaft gears 48 by means of conventional reverse idler gears 66 mounted on corresponding reverse idler shafts 67 supported by housing H via bearings (best illustrated in FIGS. 2, 5, and 6) as described in detail below. Auxiliary transmission section 14 includes two substantially identical auxiliary countershaft assemblies 68 and 68A, each having an auxiliary countershaft 70 supported by bearings 72 and 74 mounted in housing H. Each auxiliary countershaft 70 supports three auxiliary section countershaft gears 76, 78 and 80 fixed for rotation therewith. Auxiliary countershaft gears 76 are constantly in mesh with auxiliary section splitter gear 82 which is selectively coupled to mainshaft 28 via sliding jaw clutch collar 90.

As also illustrated in FIG. 1, auxiliary countershaft gears 78 are constantly in mesh with, and support, auxiliary section splitter/range gear 84 which is selectively coupled to output shaft 86 via synchronizing clutch assembly 92. Output shaft 86 is coaxial with mainshaft 28. Auxiliary section countershaft gears 80 are constantly in mesh with, and support, auxiliary section range gear 88 which is selectively engageable with output shaft 86 via two position synchronizing clutch assembly 92.

Sliding two position jaw clutch collar 90 is utilized to selectively couple either splitter gear 82, or splitter/range gear 84, to mainshaft 28. Similarly, two position synchronizing clutch assembly 92 is utilized to selectively couple splitter/range gear 84, or range gear 88, to output shaft 86.

Figure 2:
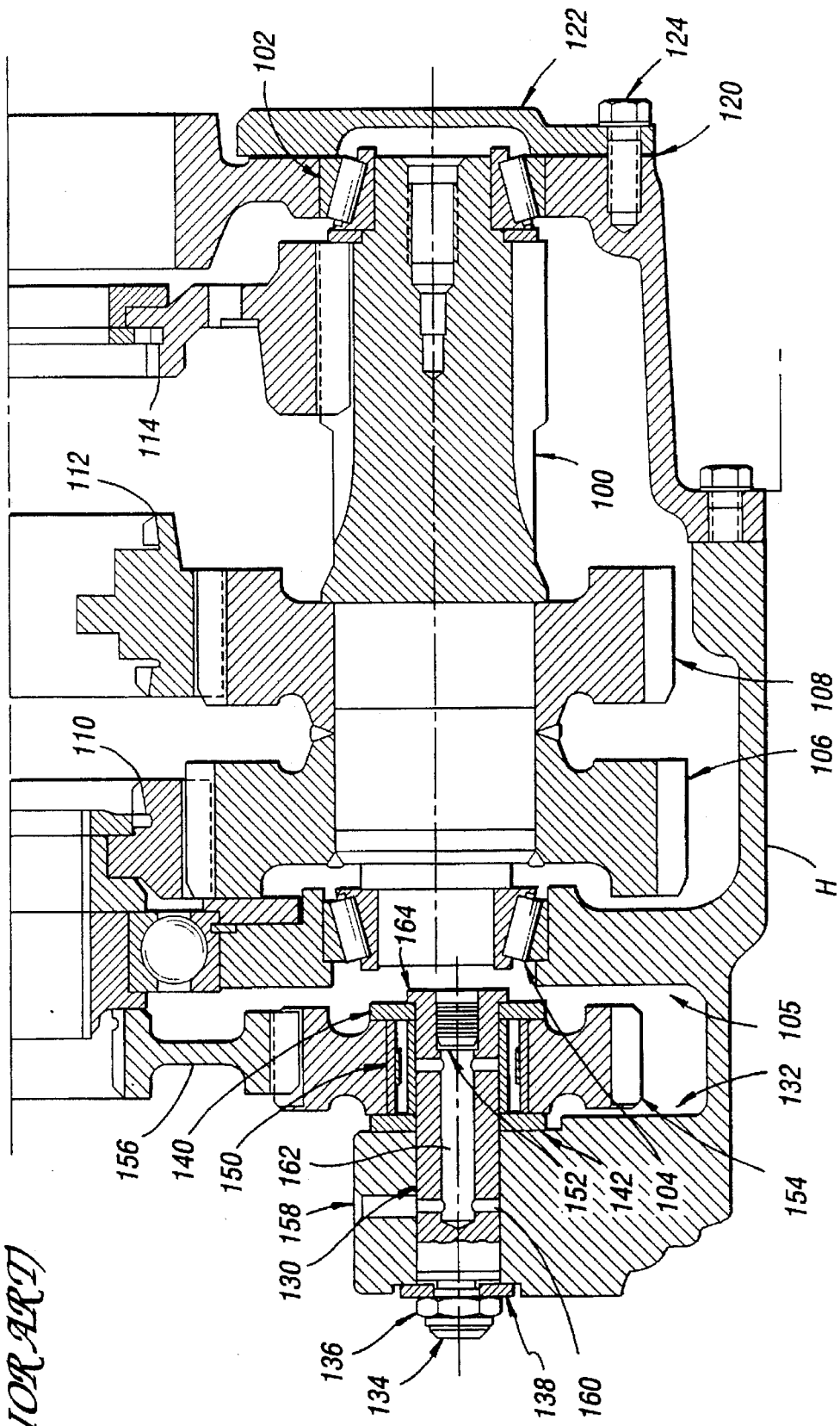
FIG. 2 is a detailed cross-section of a prior art reverse idler shaft assembly illustrating a lubrication flow path through a reverse idler shaft.

Referring now to FIG. 2, a detailed cross-section of a prior art reverse idler shaft assembly illustrating a lubrication flow path through a reverse idler shaft is shown. As shown, auxiliary countershaft 100 is positioned within housing H utilizing bearings 102 and 104. Bearing 104 is disposed within auxiliary countershaft bore which passes through intermediate wall 105 which separates the main section from the auxiliary section of the transmission. Typically, auxiliary countershaft 100 will include various gears, such as gears 106 and 108, which are constantly in mesh with corresponding gears, such as gears 110 and 112, or gear 114, which are positioned for selective engagement to the mainshaft or output shaft (not specifically illustrated).

Lubricating fluid is contained within housing H utilizing a gasket 120 interposed between housing H and cover 122 which is secured by bolts 124.

Reverse idler shaft 130 is positioned within reverse idler boss 132, preferably via an interference fit. Reverse idler shaft 130 is retained within the reverse idler bore by a threaded portion 134 secured by nut 136 which is tightened against spacer 138. Nut 136 provides a clamping force on reverse idler shaft 130 which clamps washers or spacers 140 and 142, reverse idler bearing 150, and shoulder 164 of reverse idler shaft 130. It should be noted that this clamping force travels through the inner race of bearing 150 such that the outer-race and reverse idler gear 154 are allowed to rotate freely.

With continuing reference to FIG. 2, reverse idler gear 154 is in constant meshing engagement with reverse gear 156 which is selectively engageable to the mainshaft. Reverse idler gear 154 is also in constant meshing engagement with a corresponding main-section countershaft gear (best illustrated in FIG. 1). Of course, in a twin countershaft arrangement, two substantially similar reverse idler assemblies are utilized to connect the main section reverse countershaft gears to the reverse gear which is engaged with the mainshaft.

Lubrication is provided to reverse idler bearing 150 through various channels within reverse idler shaft 130. Lubrication oil passes from cast pocket and drilled hole 158 into cross-drilled holes 160 and into center-drilled hole 162. Oil is blocked by reverse idler shaft plug 152 and passes out through additional cross-drilled holes to the inner race of bearing 150.

As illustrated in FIG. 2, the prior art reverse idler shaft 130 is manufactured from a rough forging and requires a number of machining and assembly operations. For example, various turning operations are required to produce the threaded portion 134, shoulder 164, and the internal threaded portion which receives reverse idler shaft plug 152. In addition, reverse idler shaft 130 requires a center drilling operation through a majority of the shaft length and at least two cross-drilling operations. After machining, reverse idler shaft plug 152 must be installed. During assembly into housing H, washer 138 and retaining nut 136 must be installed and tightened to produce a sufficient clamping load such that reverse idler shaft 130 and the inner race of bearing 150 do not rotate.

Figure 3:
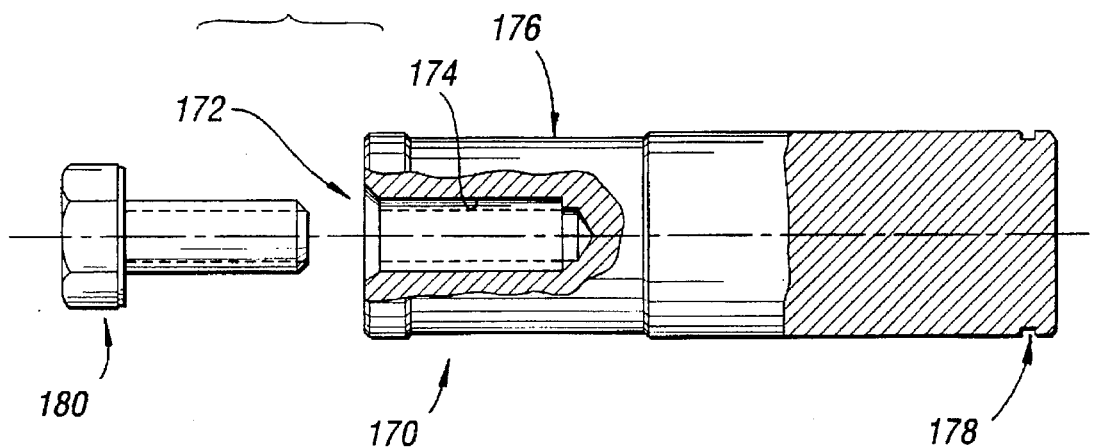
FIG. 3 illustrates a reverse idler shaft for use in a compound transmission according to the present invention.

Referring now to FIG. 3, a reverse idler shaft for use in a compound transmission according to the present invention is shown. The reverse idler shaft of the present invention is preferably manufactured from common bar stock and requires fewer machining and assembly processes to produce and install the reverse idler shaft assembly within the transmission. A reverse idler shaft according to the present invention, indicated generally by reference numeral 170, requires only a single center bore 172 having a threaded portion 174. Reverse idler shaft 170 includes an undercut area of reduced cross-section 176 to facilitate assembly into the reverse idler boss by reducing the surface area of the interference, or press fit. Reverse idler shaft 170 also includes a snap ring groove 178 as explained in greater detail below. A retaining bolt 180 produces the necessary clamping force to keep the reverse idler shaft from rotating within the reverse idler boss (in addition to preventing rotation of the inner race of the reverse idler gear bearing) as illustrated and described in detail with reference to FIG. 5.

Figure 4:
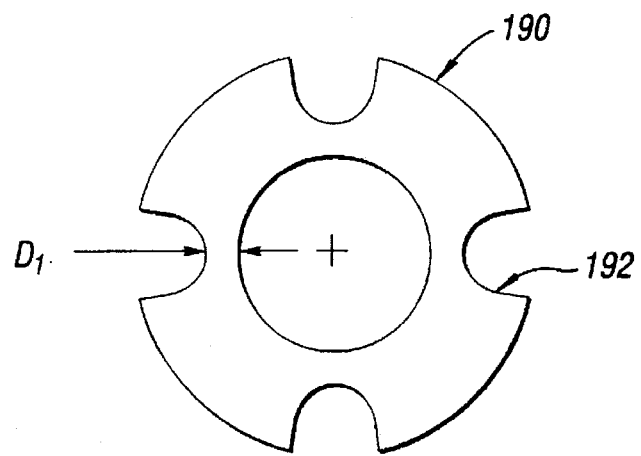
FIG. 4 illustrates a washer or spacer for providing a lubrication flow path through reverse idler bearings of a compound transmission according to the present invention.

Referring now to FIG. 4, a lubricating washer or spacer 190 according to the present invention is shown. Lubricating washer 190 includes at least one, and preferably four, oil passage notches 192. The notches 192 should be selected so as to provide a thickness $D_1$ which is greater than the thickness of the inner race and less than the thickness of the outer race (or roller bearing elements if no outer race is present) of the reverse idler gear bearing (best illustrated in FIG. 5). This provides a sufficient annular region to support the necessary clamping load to prevent the reverse idler shaft and the lubricating washer 190 from rotating during operation. Also preferably, notches 192 should be shaped to collect and direct lubricating oil through the reverse idler gear bearing as explained in greater detail below.

Figure 5:
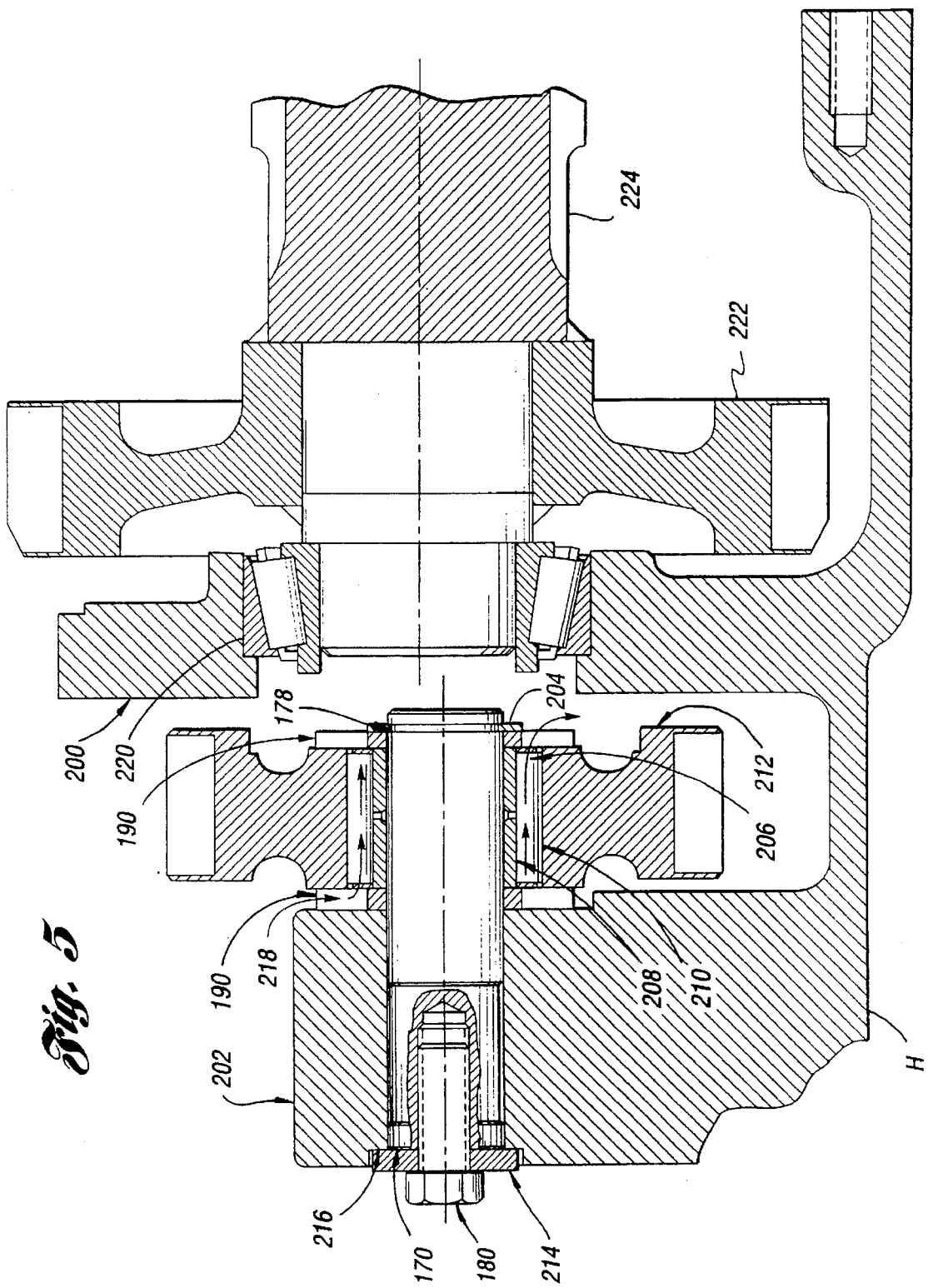
FIG. 5 is a partial cross-section of a compound transmission illustrating an installed reverse idler assembly including a reverse idler shaft and a reverse idler lubricating washer according to the present invention.

Referring now to FIG. 5, a partial cross-section of a compound transmission illustrating an installed reverse idler assembly including a reverse idler shaft and a reverse idler lubricating washer according to the present invention is shown. During assembly, reverse idler shaft 170 is passed through auxiliary countershaft bore which passes through intermediate wall 200, through lubricating washer 190, reverse idler gear bearing 206, a second lubricating washer 190, and reverse idler boss 202 of housing H. Preferably, an interference, or press fit, is maintained between reverse idler shaft 170 and the bore through reverse idler boss 202. A snap ring 204 is placed in snap ring groove 178 to retain lubricating washers 190 and bearing 206 on reverse idler shaft 170. In a preferred embodiment, snap ring 204 is a triple-wrap spiral snap ring.

Once the reverse idler assembly is in place, retaining bolt 180 is tightened which draws the assembly toward the left such that spacer 214 is forced into counter bore 216. This provides a clamping force exerted by retaining bolt 180 through spacer 214, reverse idler boss 202, lubricating washer 190, inner race 208 of reverse idler gear bearing 206, and second lubricating washer 190, which is resisted by snap ring 204. This clamping force, in addition to the interference fit between reverse idler shaft 170 and the bore through reverse idler boss 202, resists rotation of reverse idler shaft 170, lubricating washers 190, and inner race 208 of reverse idler gear bearing 206, while allowing roller bearing elements 210 and reverse idler gear 212 to rotate freely.

Lubrication oil is gravity and splash fed to lubricating washers 190 and collected by at least one notch 192 therein. As indicated generally by arrows 218, this oil is directed over the roller bearing elements 210 of reverse idler gear bearing 206 to provide lubrication. The auxiliary countershaft assembly, including auxiliary countershaft bearing 220, auxiliary countershaft gear 222 and auxiliary countershaft 224, is subsequently installed within housing H.

Figure 6:
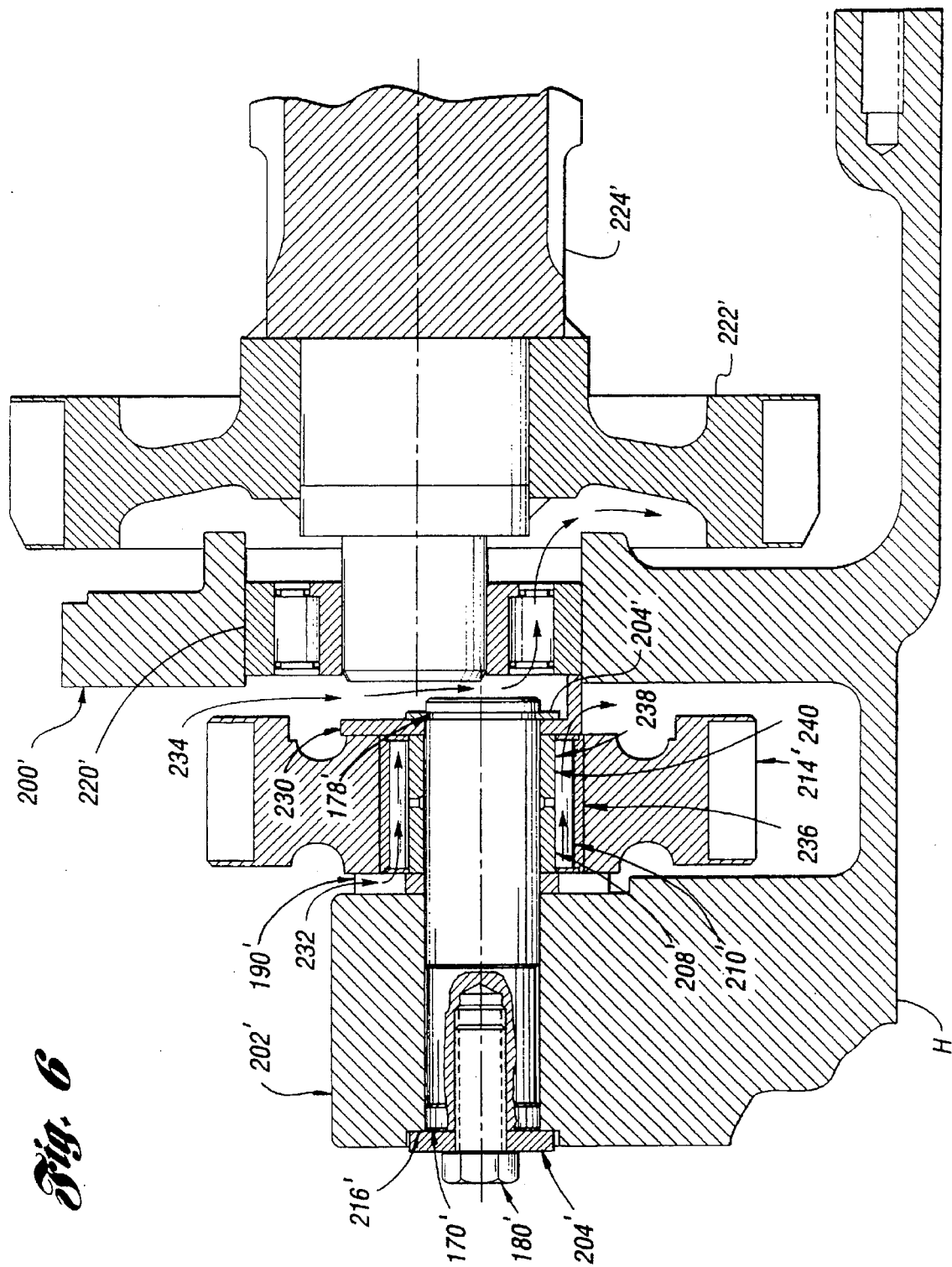
FIG. 6 is a partial cross-section of a compound transmission illustrating another embodiment of an installed reverse idler assembly including a cup washer and alternative bearing according to the present invention.

Referring now to FIG. 6, an alternative embodiment of an installed reverse idler shaft assembly according to the present invention is shown. Primed reference numerals utilized in this figure indicate components corresponding in structure and function to those parts illustrated and described in reference to FIGS. 3–5. This embodiment utilizes a cup washer 230 in cooperation with a lubricating washer 190' to create oil flow paths 232 and 234. As illustrated, flow path 232 directs lubricating oil through lubricating washer 190' into and about roller bearing elements of bearing 236. Unlike the embodiment of FIG. 5, the lubricating flow path 232 is substantially blocked by cup washer 230.

Preferably, cup washer 230 includes an eccentrically located aperture adapted for placement on reverse idler shaft 170' and is retained via spiral snap ring 204'. Also preferably, cup washer 230 includes a flange which extends horizontally into auxiliary countershaft bore and is generally circular in shape, having a center point located near the center line of auxiliary countershaft 224'. Preferably, the flange subtends an angle of about 180 degrees relative to that center point so as to form a concave "cup" portion for collecting and directing lubricating oil through auxiliary countershaft bearing 220' as indicated by lubrication flow path 234.

As also illustrated in FIG. 6, bearing 236 includes an inner race 238 surrounded by a plurality of roller bearing elements 240 which are surrounded by an outer race 242. The inner race 238 supports the clamping load exerted by the retaining bolt 180' against the snap ring 204' so as to resist rotation of the components therebetween while allowing free rotation of the outer race 242 and reverse idler gear 212'.

Thus, use of one or more lubricating washers 190 according to the present invention provides lubrication flow paths while eliminating a number of machining and assembly operations for the reverse idler gear assembly. Furthermore, the present invention allows the reverse idler shaft 170 to be manufactured from common bar stock rather than the more costly rough forgings. As illustrated in FIGS. 4–6, a reverse idler shaft according to the present invention requires only one threaded portion and eliminates the various lubrication channels and passageways within the shaft which may be found in prior art designs. A lubricating washer 190 according to the present invention collects and directs lubricating oil over the roller elements of the reverse idler gear bearing while providing a sufficient annular clamping area to resist rotation of the reverse idler shaft.

It is understood, of course, that while the forms of the invention herein shown and described constitute the preferred embodiments of the present invention, they are not intended to illustrate all possible forms thereof. It will also be understood that the words used are descriptive rather than limiting, and that various changes may be made without departing from the spirit or scope of the invention as claimed below.

What is claimed is:

1. A compound transmission for transferring torque from an input shaft to an output shaft, the transmission having a main section connected in series with an auxiliary section, the main section including a housing for containing a mainshaft generally coaxial with the input shaft and at least one countershaft generally parallel to the mainshaft and the input shaft, the mainshaft having a plurality of gears including a reverse gear mounted for selective engagement thereto, each of the at least one countershaft having a corresponding plurality of gears mounted for rotation therewith including a reverse countershaft gear, the transmission comprising:

a reverse idler shaft mounted to a portion of the main-section housing;

a bearing having an inner race and a plurality of elements facilitating rotation of a component in contact therewith, the inner race being mounted on the reverse idler shaft;

a reverse idler gear mounted on the plurality of elements, the reverse idler gear being in constant meshing engagement with the reverse gear and the at least one reverse countershaft gear; and a washer interposed between the bearing and the portion of the housing, the washer having at least one notch for directing lubricating oil to the plurality of elements facilitating rotation.

2. The transmission of claim 1 wherein the washer includes an annular portion for transferring a clamping load from the inner race to the portion of the housing, the clamping load for resisting rotation of the reverse idler shaft, the washer, and the inner race of the bearing.

3. The transmission of claim 1 wherein the reverse idler shaft is mounted via an interference fit existing between a bore passing through the portion of the housing and at least a portion of the reverse idler shaft.

4. The transmission of claim 3 wherein the reverse idler shaft includes a portion having a reduced cross-sectional area so as to reduce friction during assembly of the reverse idler shaft into the transmission.

5. The transmission of claim 1 wherein the reverse idler shaft includes a groove near one end adapted to receive a snap ring and a threaded portion adapted to receive a retaining bolt at the opposite end, the transmission further comprising:

a snap ring positioned within the groove so as to oppose axial movement of the reverse idler shaft within the bore; and a retaining bolt installed within the threaded portion for exerting a clamping load on the washer, the inner race, and the housing so as to resist rotation thereof while allowing free rotation of the plurality of elements and the reverse idler gear.

6. A reverse idler assembly for use in a compound transmission including a housing surrounding a main section having a mainshaft and at least one main-section countershaft generally parallel to the mainshaft, the mainshaft including a reverse gear positioned for selective engagement thereto, the at least one countershaft each including a reverse countershaft gear mounted for rotation therewith, the reverse idler assembly comprising:

a shaft mounted to the housing having a threaded bore adapted to receive a retaining bolt;

a bearing having an inner race and an outer race separated by a space containing a plurality of elements allowing rotation of the inner race relative to the outer race, the inner race being mounted on the shaft;

a first lubricating washer interposed between the bearing and the housing, the first lubricating washer including at least one portion for directing lubricating fluid into the space between the inner and outer races of the bearing; and a reverse idler gear mounted on the outer race, the reverse idler gear being in constant meshing engagement with the reverse gear and the reverse countershaft gear.

7. The assembly of claim 6 further comprising:

a second lubricating washer substantially similar to the first lubricating washer wherein the bearing is interposed between the first and second lubricating washers on the shaft.

8. The assembly of claim 6 wherein the first lubricating washer includes an annular portion for transferring a clamping load from the inner race to the housing, the clamping load being operative to resist rotation of the inner race and the washer.

9. The assembly of claim 8 further comprising a retaining bolt installed in the threaded bore for producing the clamping load.

10. The assembly of claim 9 wherein the shaft extends through a bore within the housing and wherein the shaft further includes a portion having a reduced diameter so as to reduce frictional force during installation of the shaft through the bore.

11. The assembly of claim 6 wherein the transmission further includes at least one auxiliary countershaft generally coaxial with the at least one main-section countershaft, the assembly further comprising:

a cup washer having an eccentrically located aperture mounted on the reverse idler shaft and a flange portion for collecting and directing lubricating oil to the at least one auxiliary countershaft.

* * * * *